United States Patent [19]

Harris et al.

[11] 4,125,169

[45] Nov. 14, 1978

[54] WHEELCHAIRS

[75] Inventors: John D. Harris, Abingdon; Michael F. Fogden, Marston; Graham E. Mead, Oxford, all of England

[73] Assignee: National Research Development Corporation, London, England

[21] Appl. No.: 805,144

[22] Filed: Jun. 9, 1977

[30] Foreign Application Priority Data

Jun. 17, 1976 [GB] United Kingdom ............... 25118/76

[51] Int. Cl.[2] ............................................... B62D 11/04

[52] U.S. Cl. .................................. 180/6.5; 180/65 A; 180/DIG. 3

[58] Field of Search ............... 180/DIG. 3, 65 A, 6.5, 180/6.48, 6.28; 280/242 WC; 297/DIG. 4

[56] References Cited

U.S. PATENT DOCUMENTS

| | | | |
|---|---|---|---|
| 2,798,565 | 7/1975 | Rosenthal | 180/6.5 |
| 3,100,547 | 8/1963 | Rosenthal | 180/6.5 |
| 3,100,860 | 8/1963 | Rosenthal | 180/6.5 X |
| 4,050,533 | 9/1977 | Seamone | 180/6.5 |

*Primary Examiner*—Joseph F. Peters, Jr.
*Assistant Examiner*—Terrance L. Siemens
*Attorney, Agent, or Firm*—Cushman, Darby & Cushman

[57] ABSTRACT

A power assisted wheelchair has a pair of larger ground wheels with handwheels mounted thereon and a pair of smaller castor wheels carrying motors drivably coupled therewith. The handwheels are rotatable relative to their ground wheels against a spring bias and operate the castor wheel motors on the corresponding sides of the chair through respective switch mechanisms. Variations of this arrangement are possible to suit different ground wheel configurations, the motors can be energized in increasing manner, the motors can be disconnected when the castors turn rearwardly, and the motors can drive through freewheel mechanisms.

5 Claims, 3 Drawing Figures

Fig. 1
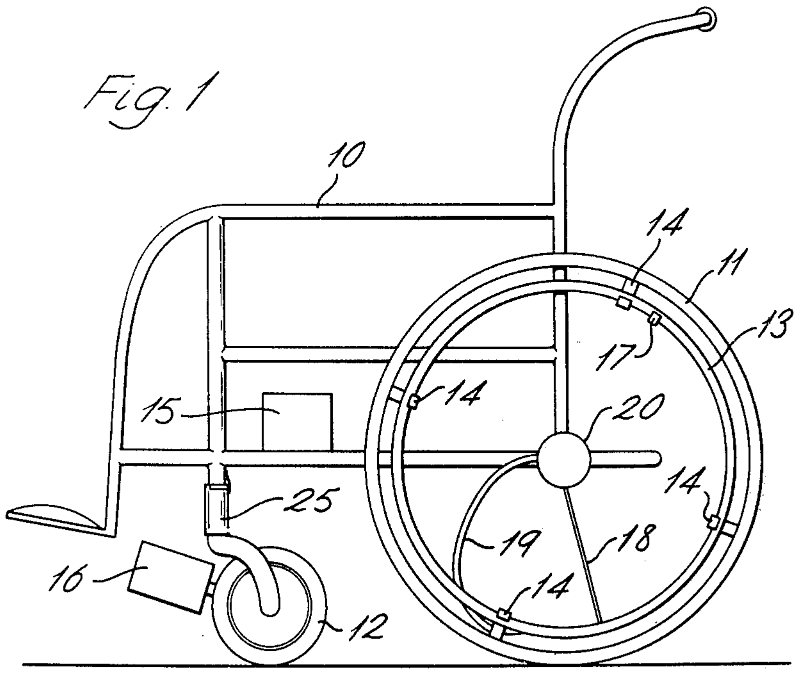
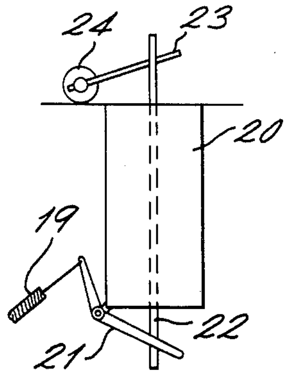
Fig. 2
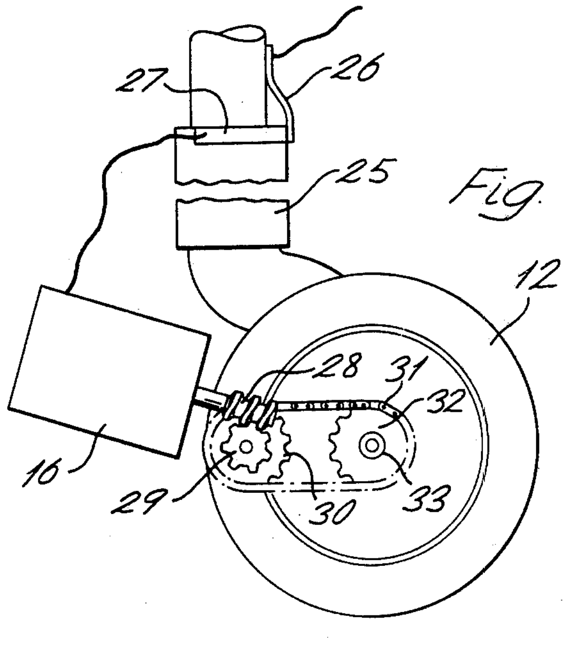
Fig. 3

WHEELCHAIRS

Wheelchairs are available in manually-powered and motorised forms and it is common for a suitation to arise in which a wheelchair user should change from the former to the latter form. This is especially appropriate, for example, when the user becomes increasingly frail with old age. However, this change-over is not always effected as readily as may otherwise be considered appropriate, and this arises for a variety of reasons among which are the higher costs of a motorised wheelchair and confusion on the part of the user in adjusting to the different controls of a motorised wheelchair.

An object of the present invention is to improve this situation, and to this end there is provided: a wheelchair comprising: at least one pair of ground-engaging wheels respectively mounted on opposite sides thereof; a pair of handwheels mounted adjacent the rim of at least one of said ground-engaging wheels for rotational movement relative thereto from a datum position against a spring bias; a pair of motors respectively drivably coupled with two of said ground-enaging wheels on opposite sides of the wheelchair; a power source for said motors which source is mounted on the wheelchair; and a pair of switch mechanisms individually connected between a respective one of said handwheels, a respective one of said motors and said power source, for operation in response to said relative rotational movement of the respective handwheel to energize the respective motor.

Normally the handwheels will be on opposite sides of the wheelchair and associated with motors on the same sides and the wheelchair can then be controlled by the user in the same manner as a conventional mannually-powered chair in so far as the driving force from the motors is initiated by way of the handwheels, and steering is effected by way of differential use of the handwheels. This avoids any incidence of confusion on the part of the user in changing from one wheelchair form to the other.

Also, since the handwheel rotation which initiates the motor drive will itself apply driving force to the first-mentioned ground-engaging wheels, the overall result is the provision of a power-assisted drive system. This reduces the need which can otherwise arise to provide a stronger chair structure to withstand the stresses of a purely power-driven system, it allows less powerful motors to be employed than would otherwise be necessary, and it also reduces the power consumption of the motors.

Preferably, the switch mechanisms energise the motors in increasing manner from zero to full power with increasing extent of handwheel rotation. This enhances the last-mentioned benefits and affords a smooth application of power assistance.

Initial development of the invention has involved modification of a wheelchair of conventional form with a pair of larger, rear wheels on which the handwheels are mounted, and a pair of smaller, front, castor wheels. The presently preferred result of this development is such as to retain the handwheels in their original location, and to mount the motors on the castor wheels, the motors being energised by way of switches rotatable with the castor wheels to disconnect the motors when the castor wheels are turned for rearward movement of the chair.

The above and other features of the invention will be more fully understood from the following decription, given by way of example, of one embodiment of the invention illustrated in the accompanying drawings, in which:

FIG. 1 schematically illustrates in side view the initial embodiment of a wheelchair according to the invention, and FIGS. 2 and 3 similarly illustrate parts of such embodiment in more detail.

The illustrated wheelchair has similar, respective drive arrangements on its side but, for convenience, only one such arrangement is illustrated.

The general configuration of the illustrated wheelchair is conventional and comprises a chair 10 supported on a pair of larger rear wheels 11 and a pair of smaller, front, castor wheel 12, the rear wheels having handwheels 13 mounted concentrically thereon adjacent their rims. However, unlike a manually-powered wheelchair in which the handwheels are fixed with their ground wheels, the handwheels 13 are mounted for relative rotation on the rear wheels 11, suitably by slidably supporting the handwheels in brackets 14 projecting from the wheels 11. The handwheels 13 are forwardly rotatable relative to the rear wheels 11 within a limited distance and against a spring bias to respectively control the energisation, by a battery 15 carried on the chair, of two electric motors 16 mounted and coupled with the castor wheels 12. This rotation is limited by at least one stop 17 projecting from the handwheel for engagement with a bracket 14, and the spring bias is provided by a leaf spring 18 connected between the handwheel and ground wheel adjacent its hub.

The essential parts of one of the energisation control arrangements are illustrated in FIGS. 1, 2 and 3. The initial part comprises a bowden cable 19 shown in FIG. 1 with its casing connected at one end to one of the brackets 14 and at the other end to, or adjacent, the hub 20 of the wheel 11. The core of the cable 19 is connected at one end with the handwheel to be pulled by relative forward motion of the latter, and at the other end to a lever as shown in FIG. 2. FIG. 2 shows the hub 20 with a bellcrank lever 21 connected adjacent one end thereof to dispose one arm of the lever generally parallel to the axis of the hub and the other arm generally radially across the hub end. The one arm of the lever is connected with the cable core and the other arm is connected with one end of a rod 22 which passes axially through the hub. The other end of the rod 22 is connected to one end of a further lever 23 which is operably coupled with a switch in the form of a potentiometer 24. This potentiometer forms part of a circuit connecting the battery 15 and the respective motor 16.

The operation of this control arrangement as so far decribed, is such that relative foward movement of the handwheel pulls the cable core to rotate the bellcrank lever, and thereby push the rod to rotate the further lever which, in turn, operates the potentiometer to progressively increase, from zero, the power supply from the battery to the motor with increasing relative forward handwheel movement. When the relative forward movement of the handwheel terminates, the spring bias on the handwheel reverses this operation.

The control arrangement includes a further part shown in FIG. 3, this part being associated with the respective castor wheel 12 and motor 16 to de-enrgise the motor when the wheel is swivelled, by rearward movement of the chair, about the vertical axis of the rotary bearing 25 from which it is suspended. Such de-energisation is effected by the provision of a switch having a wiper or brush contact 26, and a part-annular slip-ring contact 27, these contacts being individually fixed with different ones of the stationary and rotary parts of the bearing so that the contacts become disengaged when the castor wheel projects forwardly relative to the chair.

FIG. 3 also illustrates the drive coupling between each castor wheel and its motor. The motor has a worm gear 28 fixed on its drive shaft and is suitably of the commercially-available form such as used for operating windscreen wipers. The worm gear is engaged with a first gear wheel 29 which is coaxially fixed with a second gear wheel 30. The second gear wheel is coupled by a chain 31 with a third gear wheel 32 which is coaxially coupled with the castor wheel by way of a freewheel ratchet mechanism 33. It will be understood that the ratchet mechanism allows the wheelchair to be moved on its wheels without operation of the respective motor.

While the invention has been described with more particular reference to the illustrated embodiment, this embodiment is an initial form serving essentially to establish the practicality of the invention. Further development leading to production of a commercial embodment may well involved changes in detail, but without departing from the invention as discussed more generally in the foregoing introduction. Such changes may involve the control arrangements between the handwheels and energisation control circuit. For example, an alternative mechanism may avoid the necessity for operation through wheel hubs, and the spring bias may be of a different form and/or differently located compared to that shown. The control circuit may, in its simplest form, involve only an on/off switch, or it may involve an arrangement giving a constant, smooth power pick-up when switched on. Also, while it has been considered undesirable in the initial embodiment to allow motor operation during reverse movement of the wheelchair so that manual braking can be effected by way of the handwheel, this may not always be appropriate and the motors can then be coupled with non-castor wheels. Lastly, while the wheeled configuration of the initial embodiment is conventional, the invention is not limited thereto and may be applied to other configurations. For example, the invention is applicable to a three-wheeled wheelchair with only a single castor wheel. In another modification, the handwheels can be located on the same ground wheel to facilitate use by a hemiplegic.

We claim:

1. A wheelchair comprising:

a pair of larger ground-engaging wheels mounted on opposite sides of the wheelchair;

a pair of handwheels mounted adjacent the respective rims of said ground-engaging wheels for rotational movement relative thereto from a datum position against a spring bias;

a pair of ground engaging castor wheels smaller than said larger wheels and mounted on opposite sides of the wheelchair;

a pair of motors respectively drivably coupled with said castor wheels on opposite sides of the wheelchair;

a power source for said motors, which source is mounted on the wheelchair;

and a pair of switch mechanisms individually connected between a respective one of said handwheels, a respective one of said motors, and said power source, for operation in response to said relative rotational movement of the respective handwheel to energise the respective motor.

2. A wheelchair according to claim 1 wherein said switch mechanisms each connect a respective handwheel and motor on the same side of the wheelchair.

3. A wheelchair according to claim 1 comprising a further pair of switch mechanisms respectively associated with said castor wheels and operable to disconnect said motor coupled therewith when the castor wheel faces rearwardly relative to the wheelchair.

4. A wheelchair according to claim 1 wherein said motors are coupled with said castor wheels by way of a freewheel mechanism.

5. A wheelchair according to claim 1 wherein the first-mentioned switch mechanisms are operable to energise said motors in increasing manner as said handwheels undergo increasing relative rotational movement.

* * * * *